Nov. 27, 1934.　　　I. C. HARRIS　　　1,981,863
TOOL JOINT
Original Filed July 26, 1929
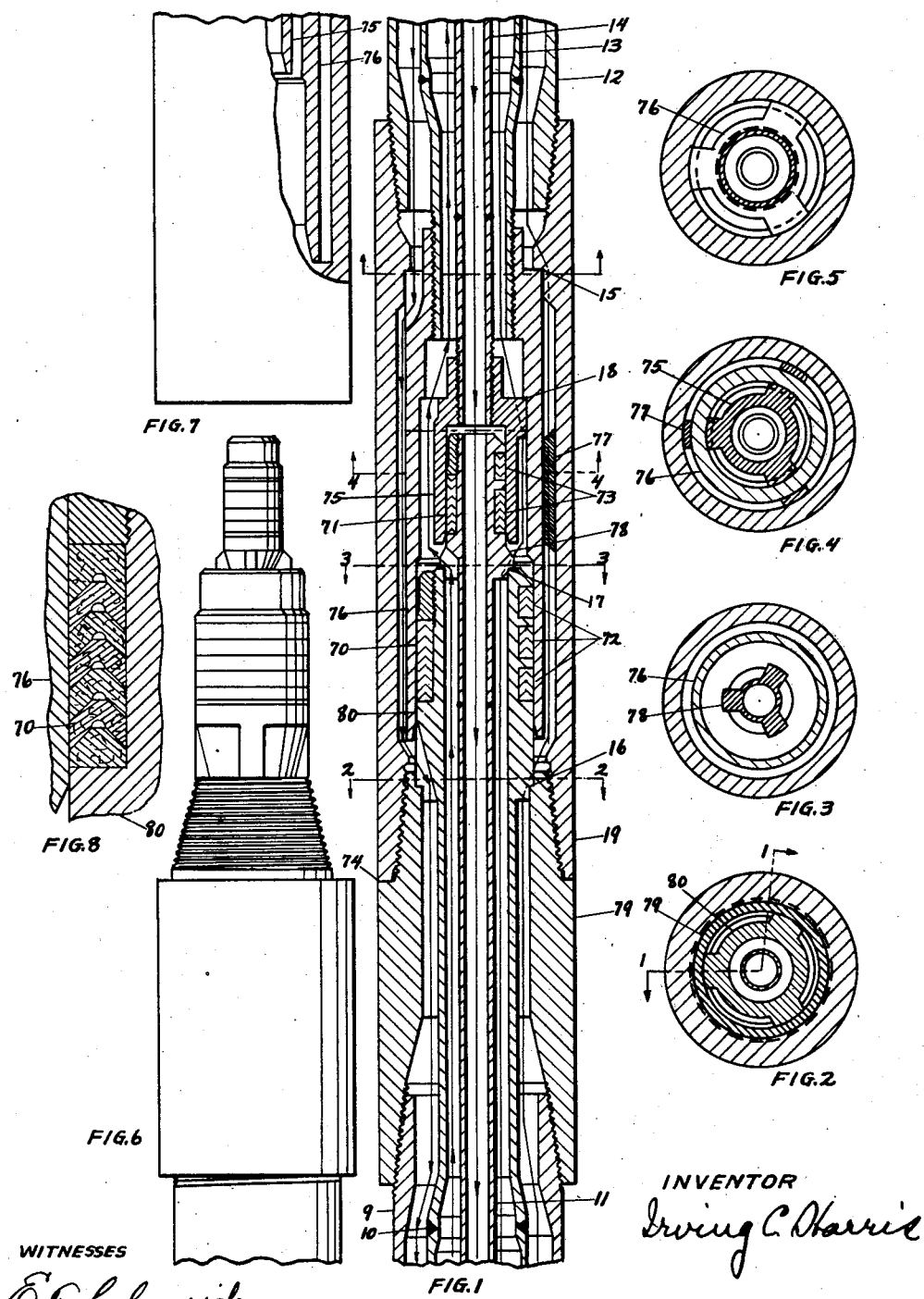
INVENTOR
Irving C. Harris
WITNESSES Patented Nov. 27, 1934

1,981,863

UNITED STATES PATENT OFFICE 1,981,863

TOOL JOINT

Irving C. Harris, Los Angeles, Calif.

Original application July 26, 1929, Serial No. 381,328. Divided and this application January 24, 1931, Serial No. 511,100. Renewed February 13, 1934

9 Claims. (Cl. 285—22)

This invention relates to tool-joints which are specially adapted for use in connecting together the sections of drill-pipe and other parts used in deep well drilling operations, such as described in my companion application, Serial Number 381,328, filed July 26, 1929 now Patent No. 1,891,416, patented Dec. 20, 1932 of which this case is a division.

In carrying on operations according to the method described in the above mentioned application, it is desirable to use a string of drill-pipe having three passageways, or conduits, for the conveyance of fluid, and so constructed and assembled in sections that the sections may be very quickly joined together in a manner such that the companion conduits for fluid will be individually connected through the joints without leakage from one conduit to another and with the certainty that each conduit will always be connected with its proper companion.

It is an object of this invention to provide a tool-joint by means of which a string of drill-pipe comprising three tubes, or pipes, may be made up in sections of convenient length for handling, and so constructed and assembled that the sections may be connected together or disconnected very quickly.

Another object is to provide a means of connecting together and supporting the drill-pipe sections such that each of the three tubes of a section of drill-pipe will carry approximately its proportionate portion of the weight of all drill-pipe hanging in the well below the stated section, and such that the tool-joint will be of ample strength and so connected to the several tubes that it will effectively carry through the tool-joint the total axial loading and distribute the loading between the several tubes. In drilling very deep wells, the axial loading on the drill-pipe at the upper end is very great; and it is important that each of the several tubes forming the drill-pipe shall carry approximately its own weight and that the tool-joint shall have strength at least equal to that of the straightway portions of the drill-pipe.

Another object is to provide a means of joining the sections of drill-pipe which will insure the joints between the companion tubes forming the several passageways being fluid-tight against leakage from one passageway to another, or from the outermost to the space outside.

Another object is to provide a means of connecting together the sections of drill-pipe that will make it impossible to make an incorrect mating of the three passageways.

A further object is to provide a means of removing the drill-pipe from the well without flooding two of the conduits under occasional conditions when the third conduit is plugged at the bottom and is filled with mud and water to a point above the tool-joint being disconnected.

Another object is to provide a means of connecting together and supporting a string of drill-pipe with three passageways for fluid such that, while fulfilling all of the other objects mentioned herein, one of the passageways is so disposed with reference to the others that the fluid flowing in it toward the drilling mechanism will be protected from contamination by leakage into it by two walls of metal in the straightway portions of the drill-pipe and by two seals or packings at the joints in the tool-joints, and a flow of the exhaust actuating fluid between the two walls of metal and two seals or packings aforesaid at a pressure below that of the fluid flowing toward the drilling mechanism in the first mentioned conduit, and with a direction and velocity such that the flow of the fluid between the two walls and two packings will tend to carry any leakage, that may pass the first wall into the conduit between the two walls, upward and out of the conduit at the surface of the ground, and tend to prevent the said leakage fluid passing through the second wall of metal or second set of seals or packings at the tool-joints.

With the foregoing objects in view, together with such other objects and advantages as may subsequently appear, the invention resides in parts, in the construction, combination, and arrangement of parts and their equivalents, hereinafter described and claimed and illustrated by way of example in the accompanying drawing, in which:

Fig. 1 is a view of the tool-joint as it appears in cross-section in two planes intersecting in the axis of the tool-joint as indicated by section-line 1—1 in Fig. 2. The planes of the section are so chosen that the portion of Fig. 1 to the left of the centerline shows a cross-section through the fluid passages, and the portion to the right of the center-line shows a cross-section through the supporting and centering webs which connect the concentric tubes together.

Fig. 2 is a view of the tool-joint shown in Fig. 1 as it appears in cross-section in a plane at right angles to its axis, through the supporting and centering webs as indicated by section-line 2—2 in Fig. 1, and looking downward.

Fig. 3 is a view of the tool-joint shown in Fig. 1 as it appears in cross-section in a plane at right angles to its axis, through the supporting and centering webs as indicated by section-line 3—3 on Fig. 1, and looking downward.

Fig. 4 is a view of the tool-joint shown in Fig. 1 as it appears in cross-section in two, parallel off-set planes at right angles to the axis of the tool-joint, through two sets of supporting and centering webs as indicated by the off-set section-line 4—4 in Fig. 1, and looking upward.

Fig. 5 is a view of the tool-joint shown in Fig. 1 as it appears in cross-section in a plane at right angles to its axis, through the supporting and centering webs, as indicated by the section-line 5—5 in Fig. 1, and looking upward.

Fig. 6 is a view of the lower portion of the tool-joint shown in Fig. 1, as it appears in side elevation when the upper portion is disconnected from it.

Fig. 7 is a view of a portion of the upper portion of the tool-joint shown in Fig. 1, as it appears in side elevation when it is disconnected from the lower portion of the tool-joint. A partial section indicates the position of the two inner, concentric sleeves, 75 and 76.

Fig. 8 is an enlarged cross-section showing the type of packing used in the tool-joint shown in Fig. 1.

The details of construction are quite fully disclosed in the drawing; and the courses of the fluids in their passage through the joint are indicated by arrows. Important members are the packings, 70 (which may be alternately as shown at 72) and 71 (which may be alternately as shown at 73). These packings are to prevent the mingling of the fluids between the several passages under all conditions of operation. The alternate constructions shown are occasioned by differences in the materials and the manner of assembly of the packings. It is to be noted that the "chevron" form of the packing rings and the method of their mounting are such that any pressure of fluid tending to pass upwardly between parts 76 and 80 will cause the rings of packing 70 to expand and press against the cylindrical surfaces of sleeves 76 and 80 in proportion to the pressure and prevent the fluid from passing.

Particular attention is called to an important feature claimed for this invention, viz: the concentric arrangement and order of the fluids and their conduits. The scavenging fluid, which is the designation used herein for the circulating, mud-laden water used with the rotary process and variously designated as "mud," "slush," "wash-water," and "circulation," is in the outer of the three concentric conduits. It has a pressure up to several thousand pounds per square inch in very deep drilling. The exhaust actuating fluid flowing upward from the fluid-pressure-operated drilling mechanism, is in the intermediate conduit and has a pressure below that of the scavenging fluid and below that of the actuating fluid going downward to the drilling mechanism in the inner conduit. Packing 70 (or 71) prevents the higher pressure from entering the intermediate conduit through the joint at the tool-joint; but, occasionally, it may be less than 100% effective, in which case, any limited leakage may be carried upward by the rapidly moving exhaust actuating fluid.

The compressed actuating fluid may have a pressure of from one to several hundred pounds per square inch; and leakage into the innermost conduit through which it flows downward to the drilling mechanism can not take place except in case of complete breakdown of the packing 70, or at some other point, and the flooding of the intermediate conduit and the building up of a pressure in excess of the pressure of the fluid in the inner conduit.

In the construction illustrated in the drawing, packing 71, (alternately 73) is shown with some of the packing rings in a reversed position, which arrangement is used so that, in case of flooding of the intermediate conduit, the reversed rings will act more effectively to cause the expansion of the packings to prevent the flow of fluid from the intermediate conduit into the inner conduit, if the pressure in the intermediate conduit should be higher than the pressure in the inner conduit.

Another important feature claimed for this combination lies in the fact that the joints, with their packings or equivalents, which prevent the intermingling of the fluids in the several conduits and the hole outside, are all made in one simple operation by screwing up the tapered, threaded tool-joint, viz: the tapered-thread that connects part 19 and part 79. The metal-to-metal shoulder joint at 74 and the two packings 70 (or 72) and 71 (or 73), which are automatic packings of the type indicated in Fig. 8, completely isolate the fluids in the several conduits from each other.

Another feature claimed for this combination lies in the fact that, in withdrawing the drill-pipe from the well under occasional conditions when the outermost conduit is plugged at the lower end and that conduit is filled with the scavenging fluid to a point above the tool-joint being taken apart, the tapered-thread joint may be unscrewed and the butt-joint 74 opened far enough to allow the fluid filling the outermost conduit above the joint being taken apart to drain out while the packing 70 remains in contact with part 76 and effective in preventing the scavenging fluid from entering the intermediate and inner conduits. After the scavenging fluid has stopped flowing, the joint may be taken away.

Another important feature claimed is the manner of centering and supporting the three concentric tubes with respect to each other. The intermediate tube 10 is centered and supported within the outer tube 9 by the seating of part 80 in part 79 at the shoulder 16 at one end, and by the seating of part 76 in part 19 at the other end of the same section of drill-pipe. In assembling, the outer tube 9 is fitted with a part 79 at one end and a part 19 at the other, either by means of threaded joints as shown which are screwed up to refusal, or by welding the parts together; after which, the intermediate tube 10 with part 80 made integral or welded to it is put in place within the outer tube, and part 76 screwed up to a seating in part 19 at the shoulder at 15. The intermediate tube is put under a slight initial tension by adjustment of part 76 in screwing it to its seat at 15 in order to insure the taking on of axial loading by the intermediate tube as soon as the outer tube begins to elongate under axial loading due to the weight of drill-pipe supported below the stated section of drill-pipe. After the proper adjustment of part 19 against the shoulder at 15, the intermediate tube is expanded into part 19. Ribs welded in place at 77 assist in centering part 76 within part 19.

The innermost tube is assembled within the intermediate tube in exactly the same manner as the intermediate tube is assembled within the outermost tube, the seating of the innermost tubing and its attached members 75 and 78 being indicated at 17 and 18.

Fig. 6 shows the outside appearance of the lower part of a tool-joint with the upper part taken away from it; and Fig. 7 shows a portion of the upper part. A partial cross-section indicates the position of the two sleeves 75 and 76 which engage packings 70 and 71.

Details of the centering and supporting webs are indicated by cross-sections shown in Figs. 2, 3, 4, and 5, which are taken on the section-lines 2—2, 3—3, 4—4, and 5—5, respectively, in Fig. 1.

It is pointed out that, by means of tool-joints constructed as set forth herein, sections of drill-pipe providing three conduits for the conveyance of fluid, may be made up permanently and be used in much the same manner as far as handling in the derrick is concerned as the ordinary single-conduit drill-pipe, and, at the same time, insure the rapid and correct matching and alignment and positive fluid-tightness of the several conduits, together with all of the other objects set forth herein, including the use of the tool-joints, or parts thereof, for connecting drill-pipe to other parts used in well-drilling and for connecting other parts together, as well as in connecting together sections of drill-pipe.

While I have shown and described the specific construction of one form in which the invention may be embodied, it is obvious that the same is capable of various modifications within the scope of what is claimed without departing from the salient features of the invention.

I claim:

1. A tool-joint, comprising two units with mating threaded portions, the outer end of each unit having three concentric sleeves adapted to be attached to the ends of three concentric pipe sections, the intermediate sleeve of one unit being adapted for welding to the intermediate pipe section at one end and attached by a threaded joint at the other end to a rotatable member which is centered within a bore and supported against a shoulder formed in the outer sleeve of the same unit, the said rotatable member and the threaded joint being adapted to allow adjustment of the relative axial position of the rotatable member and the intermediate sleeve, the said tool-joint when assembled having a central bore and two annular series of passageways forming communication between the inner pipe sections and between the spaces separating the inner and intermediate pipe sections and between the spaces separating the intermediate and outer pipe sections, respectively.

2. A tool-joint comprising two units with mating threaded portions, the outer end of each unit having three concentric sleeves adapted to be attached to the ends of three concentric pipe sections, the inner sleeve of one unit being prepared for connecting to the inner pipe section at one end and attached by a threaded joint at the other end to a rotatable member which is centered within a bore and supported against a shoulder formed in the intermediate sleeve of the same unit, the said rotatable member and the threaded joint being adapted to allow adjustment of the relative axial position of the rotatable member and the inner sleeve, the said tool-joint when assembled having a central bore and two annular series of passageways forming communication between the inner pipe sections and between the spaces separating the inner and intermediate pipe sections and between the spaces separating the intermediate and outer pipe sections, respectively.

3. A tool-joint, comprising two units with mating threaded portions, the outer end of each unit having three concentric sleeves adapted to be attached to the ends of three concentric pipe sections, the intermediate sleeve of one unit being prepared for attachment to the intermediate pipe section at one end and attached by a threaded joint at the other end to a rotatable member which is centered within a bore and supported against a shoulder formed in the outer sleeve of the same unit, the said rotatable member and the threaded joint being adapted to allow adjustment of the relative axial position of the rotatable member and the intermediate sleeve, the inner sleeve of the same unit being prepared for attachment to the inner pipe section at one end and attached by a threaded joint at the other end to a rotatable member which is centered within a bore and supported against a shoulder formed in the rotatable member first above mentioned, the inner rotatable member and the inner threaded joint being adapted to allow adjustment of the relative axial position of the inner rotatable member and the inner sleeve, the said tool-joint when assembled having a central bore and two annular series of passageways forming communication between the inner pipe sections and between the spaces separating the inner and intermediate pipe sections and between the spaces separating the intermediate and outer pipe sections, respectively.

4. A tool-joint, comprising two units with mating threaded portions, the outer end of each unit having three concentric sleeves adapted to be attached to the ends of three concentric pipe sections, the intermediate sleeve of one unit being prepared for attachment to the intermediate pipe section at one end and attached by a threaded joint at the other end to a rotatable member which is centered within a bore and supported against a shoulder formed in the outer sleeve of the same unit, the said rotatable member and the threaded joint being adapted to allow adjustment of the relative axial position of the rotatable member and the intermediate sleeve, the inner sleeve of one unit being prepared for attachment to the inner pipe section at one end and attached by a threaded joint at the other end to a rotatable member which is centered within a bore and supported against a shoulder formed in the intermediate sleeve of the unit of which the said inner sleeve is a part, the said rotatable member and the threaded joint connecting it to the said inner sleeve being adapted to allow adjustment of the relative axial position of the said inner sleeve and the rotatable member connected thereto, the said tool-joint when assembled having a central bore and two annular series of passageways forming communication between the inner pipe sections and between the spaces separating the inner and intermediate pipe sections and between the spaces separating the intermediate and outer pipe sections, respectively.

5. A tool-joint, comprising two units with mating threaded portions, the outer end of each unit having three concentric sleeves adapted to be attached to the ends of three concentric pipe sections, the said tool-joint when assembled having a central bore and two annular series of passageways forming communication between the inner pipe sections and between the spaces separating the inner and intermediate pipe sections and between the spaces separating the intermediate and outer pipe sections, respectively, one of the units having a member forming a continuation of the intermediate sleeve of that unit and positioned within a cylindrical bore in the companion member of the other unit when the tool-joint is assembled, the two members having installed between them a series of packing rings and packing retaining means, of such form and installed in such a manner as to be automatically expanded and pressed inwardly against the inner member and outwardly against the said cylindrical bore by the pressure of the fluid which the packing is intended to prevent from passing between the two members.

6. A tool-joint, comprising two units with mating threaded portions, the outer end of each unit having three concentric sleeves adapted to be attached to the ends of three concentric pipe sections, the said tool-joint when assembled having a central bore and two annular series of passageways forming communication between the inner pipe sections and between the spaces separating the inner and intermediate pipe sections and between the spaces separating the intermediate and outer pipe sections, respectively, one of the units having a member forming a continuation of the intermediate sleeve of that unit and positioned within a cylindrical bore in the companion member of the other unit when the tool-joint is assembled, the two members having installed between them packing means comprising a series of packing rings and packing retaining means of such form and installed in such a manner as to be automatically expanded and pressed inwardly against the inner member and outwardly against the said cylindrical bore by the pressure of the fluid which the packing is intended to prevent from passing between the two members, the described action of the packing means and the length of the members, axially, being such that the packing means will act as described continuously as the two units of the tool-joint are separated axially by the unscrewing of the connecting threaded joint until the said threaded joint is disengaged.

7. A tool-joint, comprising two units with mating threaded portions, the outer end of each unit having three concentric sleeves adapted to be attached to the ends of three concentric pipe sections, the said tool-joint when assembled having a central bore and two annular series of passageways forming communication between the inner pipe sections and between the spaces separating the inner and intermediate pipe sections and between the spaces separating the intermediate and outer pipe sections, respectively, one of the units having a member forming a continuation of the inner sleeve of that unit and positioned within a bore in the companion member of the other unit when the tool-joint is assembled, the two members having installed between them a series of packing rings and packing retaining means, of such form and installed in such a manner as to be automatically expanded and pressed inwardly against the inner member and outwardly against the said bore by the pressure of the fluid the packing rings are intended to prevent from passing through between the two members.

8. A tool-joint, comprising two units with mating threaded portions, the outer end of each unit having three concentric sleeves adapted to be attached to the ends of three concentric pipe sections, the said tool-joint when assembled having a central bore and two annular series of passageways forming communication between the inner pipe sections and between the spaces separating the inner and intermediate pipe sections and between the spaces separating the intermediate and outer pipe sections, respectively, one of the units having a member forming a continuation of the inner sleeve of that unit and positioned within a bore in the companion member of the other unit when the tool-joint is assembled, the two members having installed between them a series of packing rings and packing retaining means, of such form and installed in such a manner as to be expanded and pressed inwardly against the inner member and outwardly against the outer member by the pressure of the fluid the packing rings are intended to prevent from passing through between the two members in one direction, and the said two members having installed between them a second series of packing rings installed in reverse position in a manner to be expanded and pressed inwardly against the inner member and outwardly against the outer member by the pressure of the fluid the latter series of rings is intended to prevent from passing through between the two members in the opposite direction.

9. A tool-joint, comprising two units with mating threaded portions, the outer end of each unit having three concentric sleeves adapted to be attached to the ends of three concentric pipe sections, the said tool-joint when assembled having a central bore and two annular series of passageways forming communication between the inner pipe sections and between the spaces separating the inner and intermediate pipe sections and between the spaces separating the intermediate and outer pipe sections, respectively, one of the units having a member forming a continuation of the intermediate sleeve of that unit and positioned within a cylindrical bore in the companion member of the other unit when the tool-joint is assembled, the two members having installed between them packing means so adapted that the pressure of any fluid tending to pass between the two members will expand and press the said packing means inwardly against the inner member and outwardly against the said bore, and one of the units having a member forming a continuation of the inner sleeve of that unit and positioned within a bore in the companion member of the other unit when the tool-joint is assembled, the two members having installed between them packing means so adapted that the pressure of any fluid tending to pass between the two members will expand and press the said packing means inwardly against the inner member and outwardly against the said bore.

IRVING C. HARRIS.